(12) United States Patent
Kotkar et al.

(10) Patent No.: US 11,263,237 B2
(45) Date of Patent: Mar. 1, 2022

(54) SYSTEMS AND METHODS FOR STORAGE BLOCK REPLICATION IN A HYBRID STORAGE ENVIRONMENT

(71) Applicant: Veritas Technologies LLC, Santa Clara, CA (US)

(72) Inventors: Vipul D. Kotkar, Nashik (IN); Reena N. Kabra, Akola (IN); Anindya Banerjee, Pune (IN); Jayesh M. Gohil, Nashik (IN); Dhavalkumar Machhar, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 185 days.

(21) Appl. No.: 16/431,651

(22) Filed: Jun. 4, 2019

(65) Prior Publication Data

US 2020/0387522 A1 Dec. 10, 2020

(51) Int. Cl.
*G06F 16/27* (2019.01)

(52) U.S. Cl.
CPC .................................. *G06F 16/275* (2019.01)

(58) Field of Classification Search
CPC ...... G06F 16/275; G06F 3/0643; G06F 3/065; G06F 3/067; G06F 3/0619
See application file for complete search history.

(56) References Cited

U.S. PATENT DOCUMENTS 9,477,661 B1\* 10/2016 Chamness ............ G06F 16/217
10,007,695 B1\* 6/2018 Baid .................. G06F 16/2365
2011/0307736 A1\* 12/2011 George ................... G06F 3/067
714/6.2
2013/0254416 A1\* 9/2013 Abraham ................ H04L 67/12
709/230
2015/0169225 A1\* 6/2015 Curley ................ H04L 67/1095
711/162
2018/0314430 A1 11/2018 George et al.

FOREIGN PATENT DOCUMENTS

WO 2020/247455 A1 12/2020

OTHER PUBLICATIONS

International Search Report and Written Opinion received for PCT Application Serial No. PCT/US2020/035863 dated Sep. 15, 2020, 8 pages.

\* cited by examiner

*Primary Examiner* — Albert M Phillips, III
(74) *Attorney, Agent, or Firm* — FisherBroyles, LLP (57) ABSTRACT

The disclosed computer-implemented method for storage block replication in a hybrid storage environment may include receiving a request associated with a data source being replicated to modify a cloud object, storing an instruction for modifying the cloud object, determining that a replication operation for the source has completed, and modifying the cloud object and deleting the instruction for modifying the cloud object in response to determining that the replication operation has completed. In some examples, the request to modify the cloud object may include deleting the cloud object. Various other methods, systems, and computer-readable media are also disclosed.

20 Claims, 11 Drawing Sheets

SYSTEMS AND METHODS FOR STORAGE BLOCK REPLICATION IN A HYBRID STORAGE ENVIRONMENT

BACKGROUND

Data storage requirements for computer applications continue to grow rapidly. Physical data storage may not be cost efficient for less frequently accessed data. As a result, systems may move less frequently used data to cloud-based storage applications. Cloud storage providers may provide a platform for storing and retrieving data at a competitive, affordable price compared with local data storage. Additionally, cloud storage providers typically provide their own disaster recovery solutions, reducing the requirements for local disaster recovery.

In some examples, when cloud storage is used as block storage media, a hybrid storage solution may be implemented. The hybrid storage solution may include a storage volume set containing local volumes and cloud volumes. The local volumes may include a mapping between files and cloud objects containing data. Thus, rather than storing all data locally, local storage may identify cloud objects that contain the actual application data. Although cloud storage providers typically provide their own disaster recovery solutions, there is still a need to have a disaster recovery solution for any storage not on the cloud.

SUMMARY

As will be described in greater detail below, the present disclosure describes various systems and methods for storage block replication in a hybrid storage environment as a disaster recovery solution. In one embodiment, a method for storage block replication in a hybrid storage environment may include receiving a request associated with a data source being replicated to modify a cloud object, storing an instruction for modifying the cloud object, determining that a replication operation for the source has completed, and modifying the cloud object and deleting the instruction for modifying the cloud object in response to determining that the replication operation has completed. In some examples, the request to modify the cloud object may include deleting the cloud object.

In some examples, the method may further include determining that the source being replicated is replicated synchronously and, in response to determining that the source is being replicated synchronously, immediately modifying the cloud object.

In some examples, the method may further include determining a replication lag time, storing a timestamp for the request to modify a cloud object, calculating a marker time based on a current time and the replication lag time, and comparing the marker time to the timestamp to determine that the replication operation for the source has completed. In some examples, the method may further include storing the request to modify the cloud object and the timestamp in a cloud modification database. In some examples, the method may further include sorting entries in the cloud modification database according to the timestamp.

In some examples, the method may further include storing a data source including metadata mapping a plurality of cloud objects, modifying the data source, and replicating the modified data source.

In one example, a system for storage block replication in a hybrid storage environment may include modules stored in memory and at least one physical processor operable to implement the modules. The modules may include a volume manager module operable to receive a request associated with a source volume being replicated to modify a cloud object, store an instruction for modifying the cloud object, determine that a replication operation for the source volume has completed, and in response to a determination that the replication operation has completed, modify the cloud object and delete the instruction for modifying the cloud object.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to receive a request associated with a data source being replicated to modify a cloud object, store an instruction for modifying the cloud object, determine that a replication operation for the source has completed, and modify the cloud object and delete the instruction for modifying the cloud object in response to determining that the replication operation has completed.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

FIG. 6A through FIG. 6K are block diagrams of an example of storage block replication in a hybrid storage environment.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for storage block replication in a hybrid storage environment. Storage block replication provides data redundancy that may be used in a disaster recovery plan. However, storage block replication in a hybrid storage environment may bring challenges not present with replication of local storage. A traditional storage block replication system may not be aware of the file level cloud tiering and may simply replicate all local storage. In cases of asynchronous replication, the source and the target may not always be in sync despite sharing the same cloud copy data. In instances where a failure occurs at the source, out of sync local data may result in objects that are inaccessible by a replication target.

Moreover, the systems and methods described herein may improve the functioning and/or performance of a data replication system that replicates local data in a hybrid storage environment. These systems and methods may also improve the fields of computing and/or backup systems by providing reliable access to cloud objects by a replication target during asynchronous data replication processes.

Figure 1:
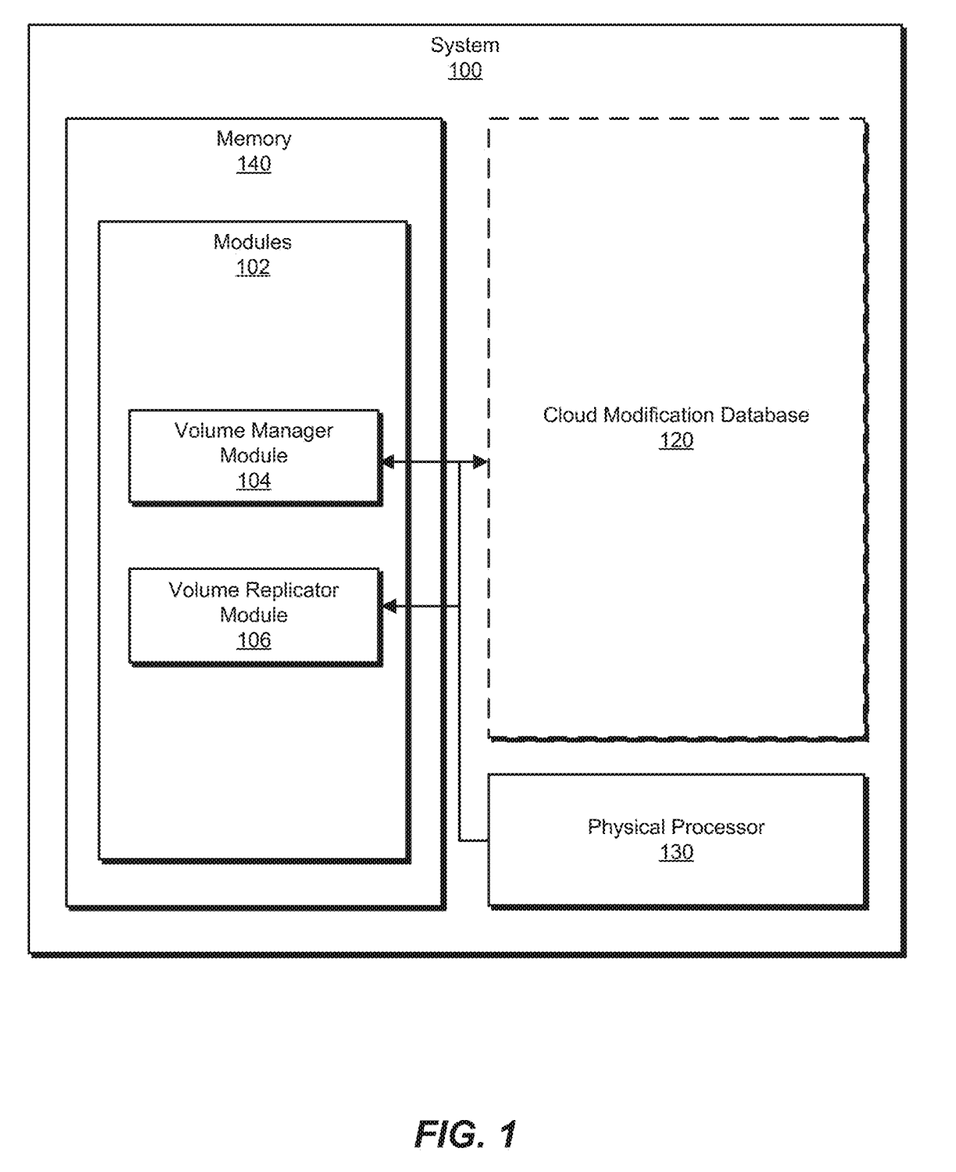
FIG. 1 is a block diagram of an example system for storage block replication in a hybrid storage environment.
Figure 2:
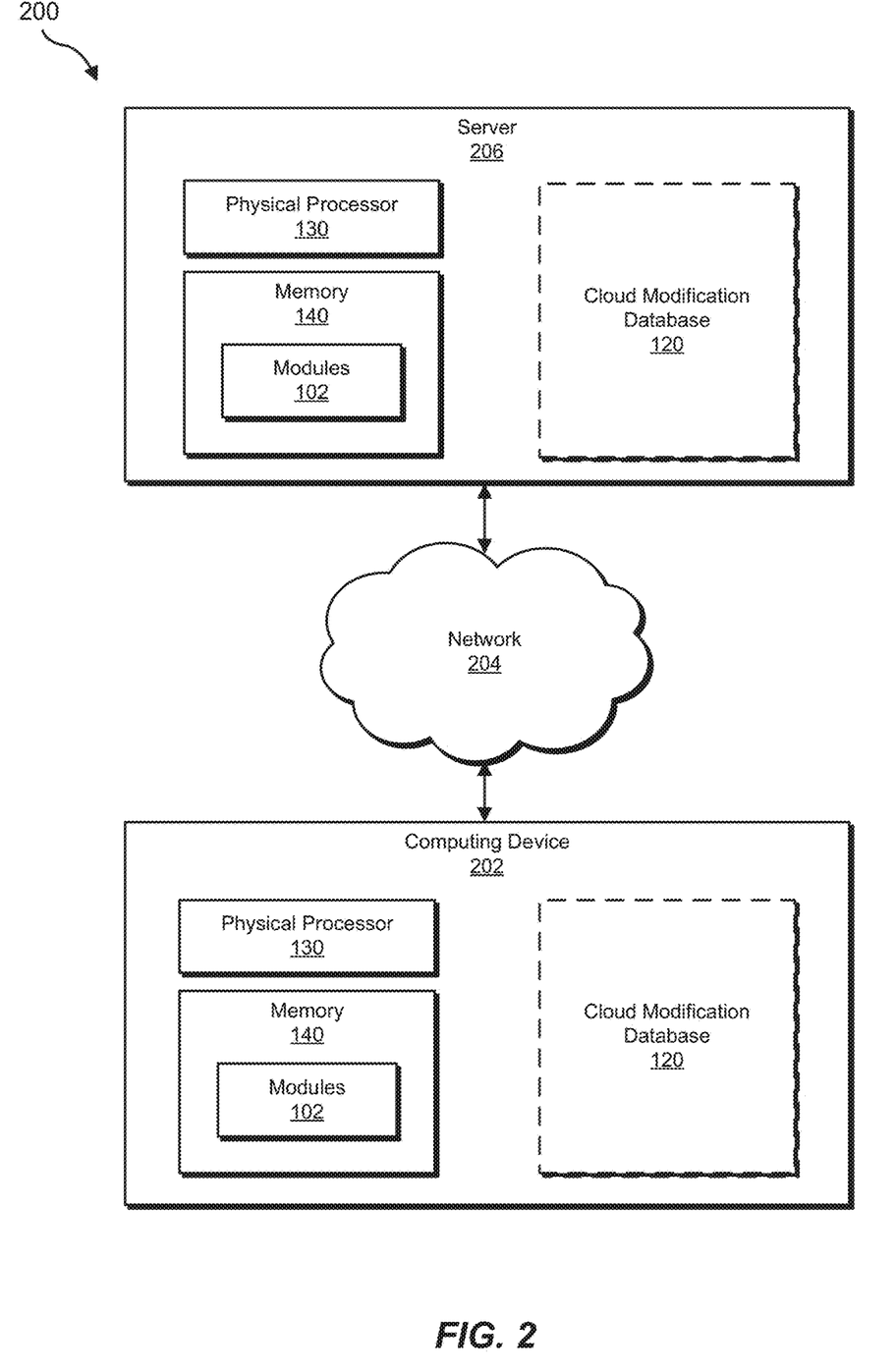
FIG. 2 is a block diagram of an additional example system for storage block replication in a hybrid storage environment.

The following will provide, with reference to FIGS. 1-2, detailed descriptions of example systems for storage block replication in a hybrid storage environment. Detailed descriptions of example hybrid storage environments having files with local data referencing locations in cloud storage will be provided in connection with FIG. 3. Detailed descriptions of an example storage block replication system for replicating local data in a hybrid storage environment will be provided in connection with FIG. 4. Detailed descriptions of corresponding computer-implemented methods for storage block replication in a hybrid storage environment will also be provided in connection with FIG. 5. In addition, a detailed description of storage block replication in a hybrid storage environment will be provided in connection with FIG. 6A through FIG. 6K.

FIG. 1 is a block diagram of an example system 100 for storage block replication in a hybrid storage environment. As illustrated in this figure, example system 100 may include one or more modules 102 for performing one or more tasks. As will be explained in greater detail below, modules 102 may include a volume manager module 104 and a volume replicator module 106. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate storage block replication in a hybrid storage environment. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more data storage elements for tracking modifications to cloud storage, such as cloud modification database 120. Cloud modification database 120 may generally represent any type or form of data storage that tracks instructions that modify cloud storage. Examples of cloud modification database 120 include, without limitation, databases tracking requests to modify a cloud object such as write requests, copy requests, and delete requests along with associated data such as a modification request time.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to replicate storage blocks in a hybrid storage environment.

Computing device 202 generally represents any type or form of computing device capable of reading computer-executable instructions. Computing device 202 may be a local computer having data storage requiring replication. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

Server 206 generally represents any type or form of computing device that is capable of providing a service for replicating storage data. Additional examples of server 206 include, without limitation, storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
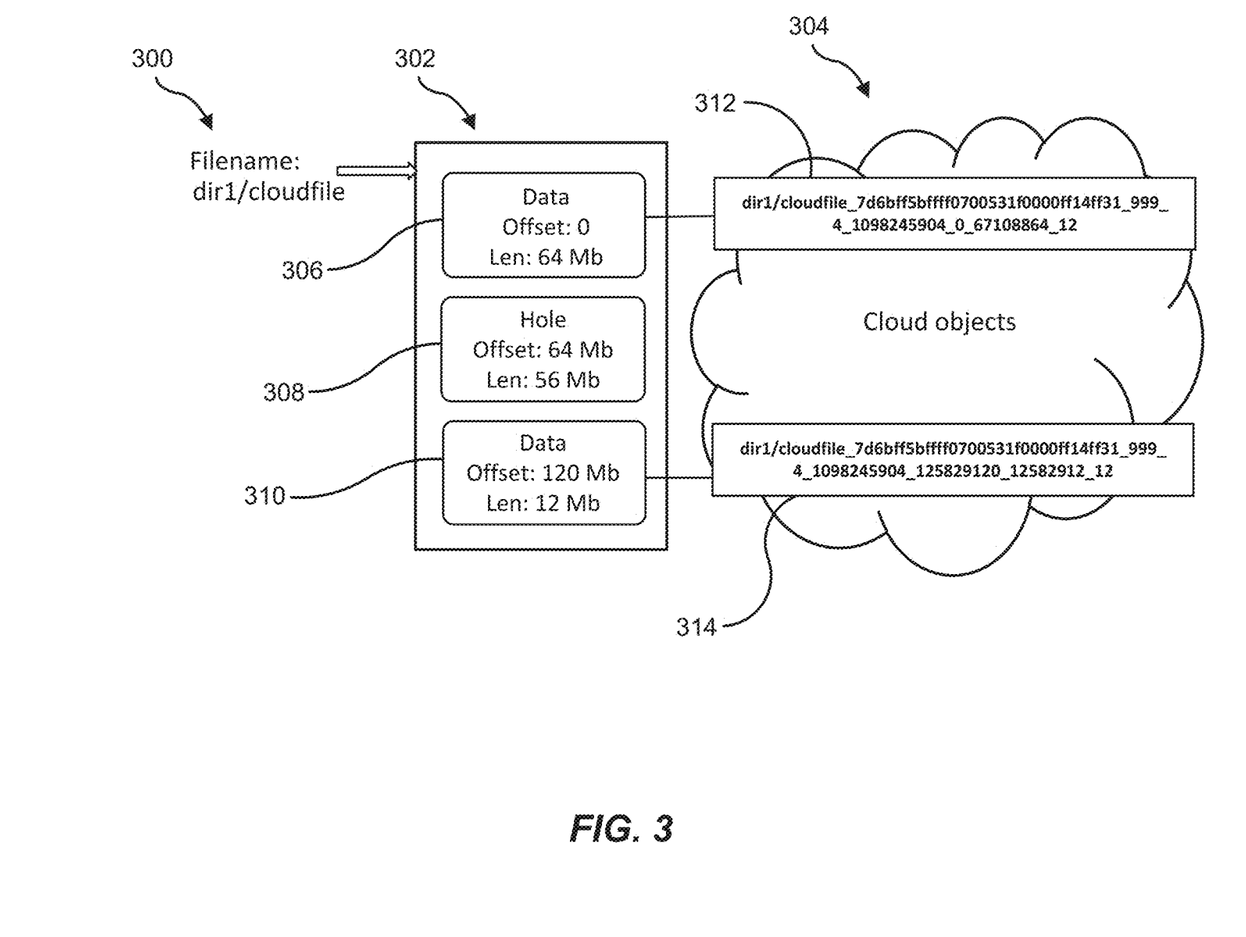
FIG. 3 is a block diagram of an example hybrid storage environment.

FIG. 3 is a block diagram of an example hybrid storage environment 300. In hybrid storage environment 300, cloud tiering may allow a file's metadata to be stored on-premise and application data to be stored as cloud objects 312, 314. In the example of FIG. 3, a file 302 may be represented by metadata referencing a location of a cloud object in the cloud storage 304. The metadata may include a data reference 306 pointing to cloud object 312, hole reference 308 which serves as a placeholder for additional data, and data reference 310 pointing to cloud object 314. Each metadata entry may further include a data offset and a data length. File 302 of FIG. 3 may be assembled by including the data from cloud object 312 with zero data offset and a length of 64 Mb, followed by a hole starting at 64 Mb with a length of 56 Mb, and followed by data from cloud object 314 offset by 120 Mb from the start of the file with a length of 12 Mb.

Figure 4:
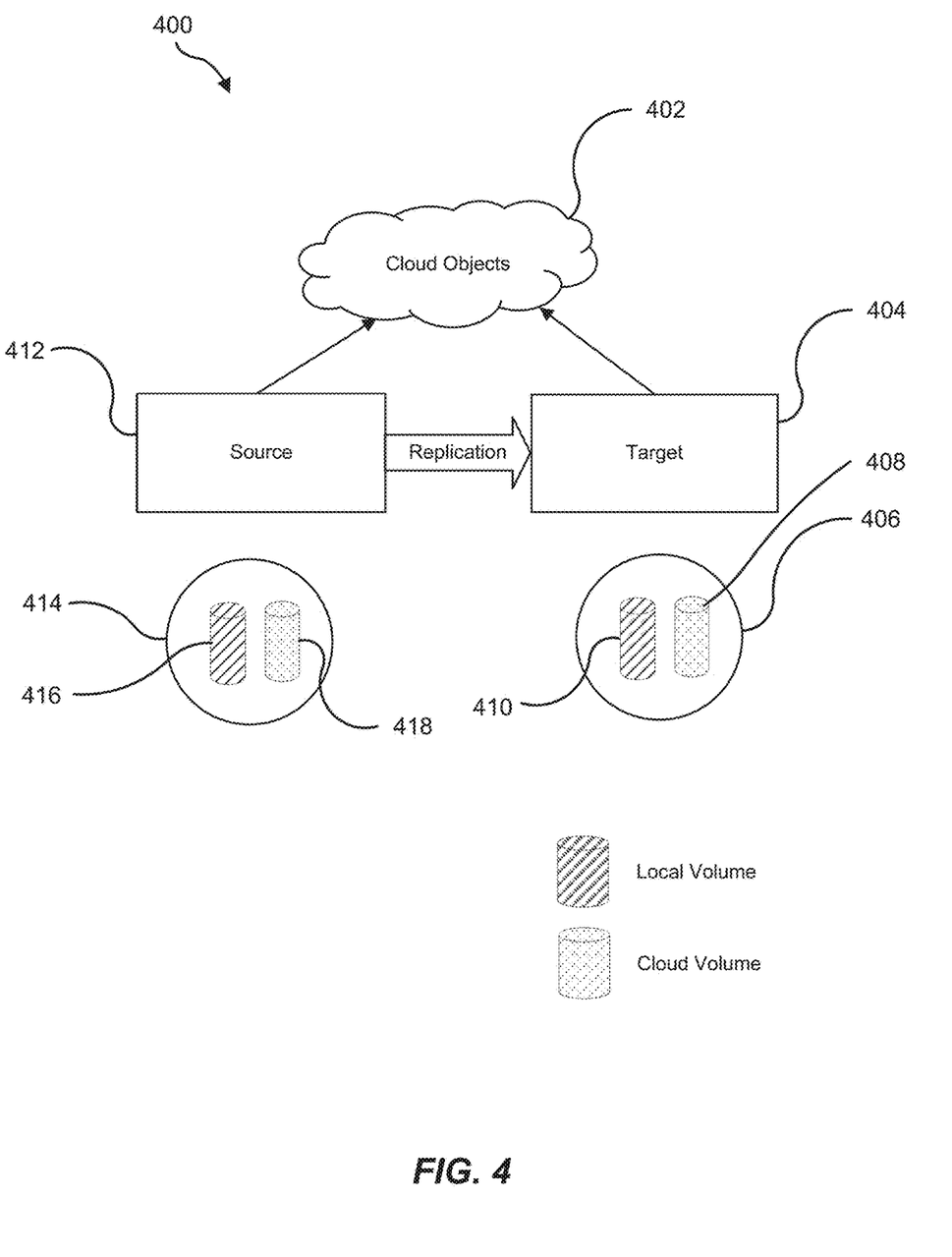
FIG. 4 is a block diagram of a storage block replication system.

FIG. 4 is a block diagram of a storage block replication system 400. Storage block replication system 400 may be implemented using the example system 100 of FIG. 1, the computing system of FIG. 2, or combinations of example system 100 and computing system 200. Storage block replication system 400 may include a source 412 having a first volume set 414 and a target 404 having a second volume set 406. Source 412 may be a first computing device or computing system and target 404 may be a second computing device or computing system. Each volume set 414, 406 may include local volumes 416, 410 and cloud volumes 408, 418. The local volumes 410, 416 may store data that is accessed frequently, while the cloud volumes 408, 418 may store data that is accessed less frequently. The local volumes 410, 416 may store file metadata, such as data references 306, 310 referencing objects in the cloud volumes 408, 418.

Both source 412 and target 404 are communicatively coupled to cloud storage 402 containing cloud objects, such that the cloud volumes 408, 418 may be stored as a combination of cloud objects within the cloud storage 402. A replication process may replicate the first volume set 414 at the source to the second volume set 406 at the target 404. For example, when the source adds a file to first volume set 414, a replication system may add an identical file to the second volume set 406. Or if the source 412 deletes a file at the first volume set 414, the replication system may delete the file at the second volume set 406. In a hybrid storage environment, because both the source 412 and the target 404 share the cloud objects stored in the cloud, there may not be a need to replicate the cloud volume 418. Instead, only the first local volume 416 containing data referencing the cloud objects may be replicated.

A replication process may be either synchronous or asynchronous. Synchronous replication takes place in real time and is preferred for applications with low recovery time objectives that can't lose data. It's primarily used with high end transactional applications that requires instantaneous failover in the event of a failure. Asynchronous replication may be time delayed. Furthermore, asynchronous replication may be designed to work over distances and require less bandwidth. Asynchronous replication is intended for applications that can withstand lengthier recovery point objectives.

During asynchronous replication there may be instances in which the first local volume 416 and the second local volume are not identical due to a time delay in the replication process. For example, immediately after a change to the first local volume 416 the second local volume 410 may have an older version of the file system until asynchronous replication occurs. In a traditional filesystem, this may not pose any problems, since in the event of a failure by the source, the target can use the valid, albeit slightly older, file system for further computing. However, for a hybrid storage system, the cloud storage may have a single data copy for both the first cloud volume 418 and the second cloud volume 408. Thus, if a file operation at the source were to immediately modify an object in the cloud storage 402, that change would not be reflected at the target 404 until asynchronous replication completes. In the instance of a file operation that deletes a cloud object, the target, having an older replica of first local volume 416, may have a second local volume that references a cloud object that no longer exists. The presently disclosed embodiments enable asynchronous replication of the first local volume 416 while providing a failover to the second local volume 410 in case of a crash at the source.

Figure 5:
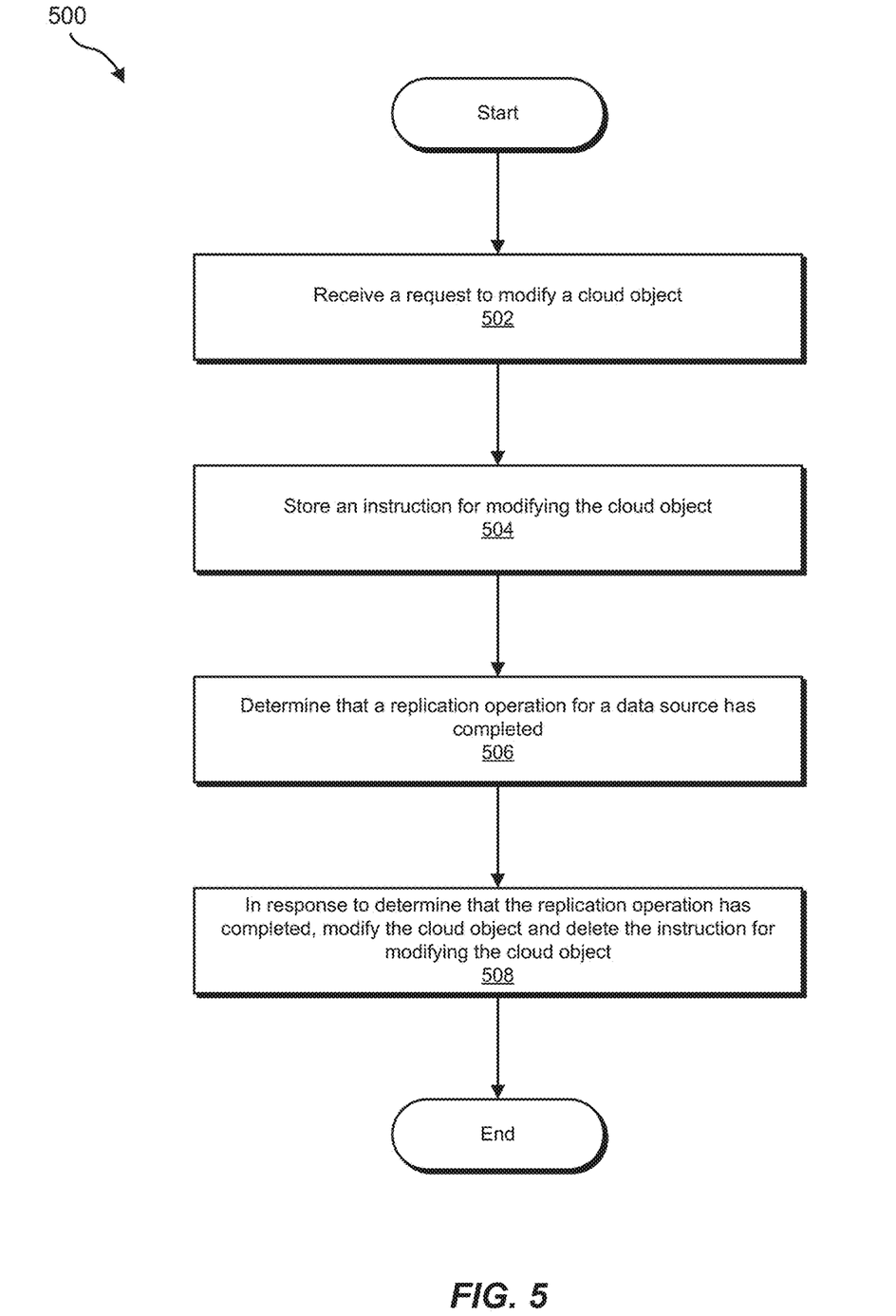
FIG. 5 is a flow diagram of an example method for storage block replication in a hybrid storage environment.

FIG. 5 is a flow diagram of an example computer-implemented method 500 for storage block replication in a hybrid storage environment, such as the example hybrid storage environment of FIG. 3. The steps shown in FIG. 5 may be performed by any suitable computer-executable code and/or computing system, including system 100 in FIG. 1, system 200 in FIG. 2, and/or variations or combinations of one or more of the same. In one example, each of the steps shown in FIG. 5 may represent an algorithm whose structure includes and/or is represented by multiple sub-steps, examples of which will be provided in greater detail below.

As illustrated in FIG. 5, at step 502 one or more of the systems described herein may receive a request to modify a cloud object. For example, volume manager module 104 may, as part of computing device 202 in FIG. 2, receive a request to modify a cloud object. The request to modify a cloud object may originate from the computing device 202 or a computer remote from the computing device 202. For example, in some embodiments a computing device 202 may send the modification request to a volume manager module 104 of server 206.

The term "cloud object," as used herein, generally refers to an object of an object-storage architecture operating remotely from a computing device. The "cloud object" may include data and a globally unique identifier for referring the object directly.

The systems described herein may perform step 502 in a variety of ways. In one example, volume manager module 104 may, as part of computing device 202 or server 206 may receive a request to modify a cloud object, such as cloud object 312. For instance, a computing device, such as computing device 202 or other computing device may modify file 302, modifying cloud data associated with reference 306. Volume manager module 104 may then receive file modification as a request to modify cloud object 312. For example, if computing device 202 were to delete file 302, volume manager module 104 may receive a request to delete cloud objects 312, 314. In some examples, a modification other than a delete request may be written as a new cloud object. For example, if a change to file 302 included updating the file content, volume manager module 104 may create a new cloud object and delete an existing cloud object rather than modify the existing cloud object.

As illustrated in FIG. 5, at step 504 one or more of the systems described herein may store an instruction for modifying the cloud object. For example, volume manager module 104 may, as part of computing device 202 in FIG. 2, store an instruction for modifying the cloud object. In some examples, volume manager module 104 may store the instruction in cloud modification database 120.

The systems described herein may perform step 504 in a variety of ways. In one example volume manager module 104, as part of computing device 202 or server 206 may store an instruction to modify a cloud object, such as cloud object 312. For instance, computing device 202 may store an instruction for modifying the cloud object 312 in cloud modification database 120, or in some examples, the instruction for modifying the cloud object 312 may be stored remotely, such as at cloud modification database 120. In some examples, volume manager module 104 may store additional information such as a timestamp of a time associated with the request. For example, if computing device 202 were to delete file 302, computing device 202 may issue a request to volume manager module 104 to delete cloud objects 312, 314 and volume manager module 104 may save the request as an instruction in cloud modification database 120.

As illustrated in FIG. 5, at step 506 one or more of the systems described herein may determine that a replication operation for a data source has completed. For example, volume manager module 104 may, as part of computer device 202 in FIG. 2, receive a notice that a replication process has completed. In other examples, volume manager module 104 may analyze cloud modification database 120 to determine whether a replication process has completed.

The systems described herein may perform step 506 in a variety of ways. In one example, volume manager module 104 may, as part of computing device 202 of FIG. 2, receive a notification that a replication process has completed. For example, a target computing system may send a notification to the volume manager module 104 that the replication process has completed. In another example, volume manager module 104 may determine that the replication process has completed by performing an analysis of cloud modification database 120. In some examples, volume manager module 104 may periodically analyze the cloud modification database 120 to determine if a replication process has completed. The period between the analysis may be a fixed time interval, or in some examples, the period may vary depending on other factors such as cloud modification database 120 activity.

Volume manager module 104 may perform the analysis to determine that a replication activity completed in a variety of ways. In one example, volume manager module 104 may store entries in the cloud modification database 120 with a timestamp. Additionally, a replication delay time may be determined for the replication process. The volume manager module 104 may add the replication delay time to the time stamp for entries in the cloud modification database 120. If the result is older than the current time, volume manager module 104 may assume the replication has taken place. If the result is newer than the current time, volume manager module 104 may assume the replication has not yet taken place.

In other examples, the volume manager module 104 may subtract the replication delay time from the current time. If the timestamp of an entry in the cloud modification database 120 is older than the resulting time, then the volume manager module 104 may assume the replication process has completed. If the time stamp of the instruction entry in the cloud modification database 120 is newer than the resulting time, then volume manager module may assume that the replication process has not completed.

In some examples, the entries in the cloud modification database may be sorted according to the timestamp. Therefore, a while loop may be performed starting with the oldest entries. Once the loop determines that the replication process has not completed, the loop may exit. For example, volume manager module may use the following pseudocode to analyze the database:

```
1.   while (1) do
2.       sleep(for predefined time)
3.       while (entries in database) do
4.           fetch an entry and get object name, delete request time
5.           marker time = current time − replication lag time
6.           if (marker time > delete request time in database) then
7.               break;
8.           fi
9.           Issue cloud object delete
10.          Delete this entry from the database
11.      done
12.  done
```

As illustrated in FIG. 5, at step 508 one or more of the systems described herein may modify the cloud object and delete the instruction for modifying the cloud object. For example, volume manager module 104 may, as part of computer device 202 in FIG. 2, issue a command to a cloud provider to modify the object and then delete the stored instruction. In some examples, the volume manager module 104 may, as part of computer device 202 in FIG. 2, delete the instruction from cloud modification database 120.

The phrase "delete the stored instruction," as used herein, generally refers to removal of the instruction from further execution. In some examples, the cloud modification database 120 may store the instructions and volume manager module 104 may mark the instructions as executed once the cloud object is modified. Thus, the instruction may be removed from further execution, but may still be available in the cloud modification database 120. This may allow for a history of cloud modifications performed by the volume manager module 104.

The previously described pseudo code provides an example of modifying the cloud objects and deleting the instruction. The pseudo code operates as a while loop that wakes periodically to analyze the cloud modification database 120 to determine if a replication process has completed. If an instruction has been replicated, then the cloud object is modified, and the entry is deleted from the database. If the cloud modification database 120 is sorted according to modification time, then once an instruction is determined to be unreplicated, the while loop may break, and the process sleeps until woken up again.

In some examples, the method may further include determining that the source being replicated is replicated synchronously and in response to determining that the source is being replicated synchronously, immediately modifying the cloud object. One or more of the systems described herein determine that the source is being replicated synchronously. For example, volume manager module 104 may, as part of computer device 202 in FIG. 2, may determine if a replication process is synchronous.

For example, replication system may use the following pseudocode to process a file deletion:

```
1.  Remove the file's directory entry
2.  Do required metadata changes at source site
3.  Cloud delete request will be received by volume manager
4.  Check if asynchronous block level replication is running and pass
the flag to cloud demon
5.  if (async_vvr_running) then
6.      Add entry for this object in database file along with timestamp,
volume guid, disk group id and cloud type
7.  else
8.      delete object from cloud immediately
9.  fi
```

FIG. 6A through 6K illustrate a block diagram of a replication system 600, such as replication system 400, implementing a method, such as method 500, for replicating a hybrid data storage system such as hybrid storage environment 300. The replication system 600 may include source data 606, target data 608, and cloud objects 604 stored in data cloud 602. The source data 606 and the target data 608 include metadata referencing cloud objects 604 as part of a file. The source data 606 may be replicated to the target data 608 by replicator module 106. In some examples, replicator module 106 may run as a distributed system, operating on computing devices associated with source data 606 and a target data 608, on a single computing device with access to source data 606 and target data 608, or a combination of a computing device such as a server 206 in communication with a source computing device and a target computing device.

Figure 6A:
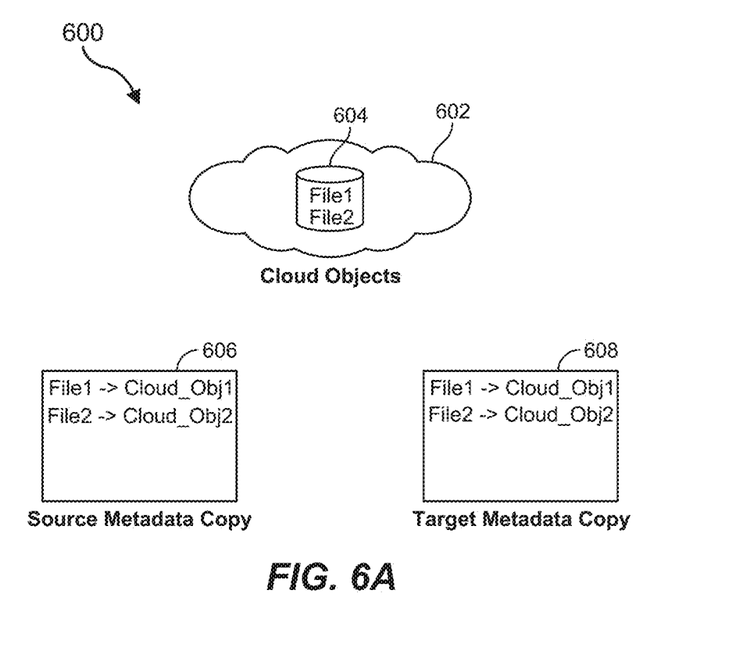
Figure 6B:
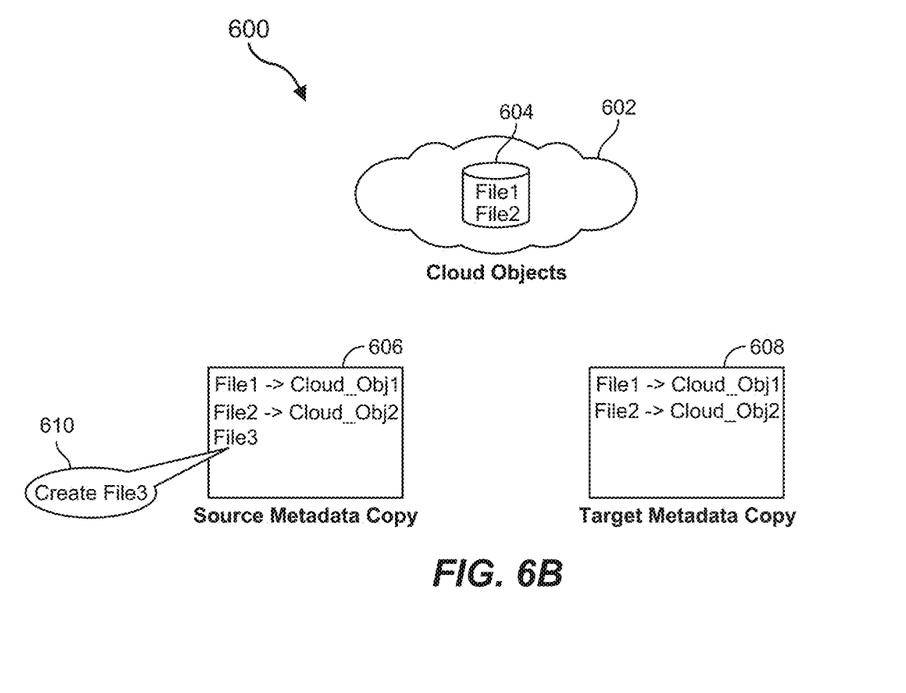

In FIG. 6A, the source data 606 and the target data 608 are in sync and both identify the same cloud objects 604 as part of a file. In FIG. 6B, volume manager module 104 may receive an instruction 610 to create a file and updates the source data 606 to reflect the pending creation of a new cloud object. At this point, the source data 606 and the target data 608 may be out of sync since the replication system 600 has not yet replicated the source data 606 to the target data 608.

Figure 6C:
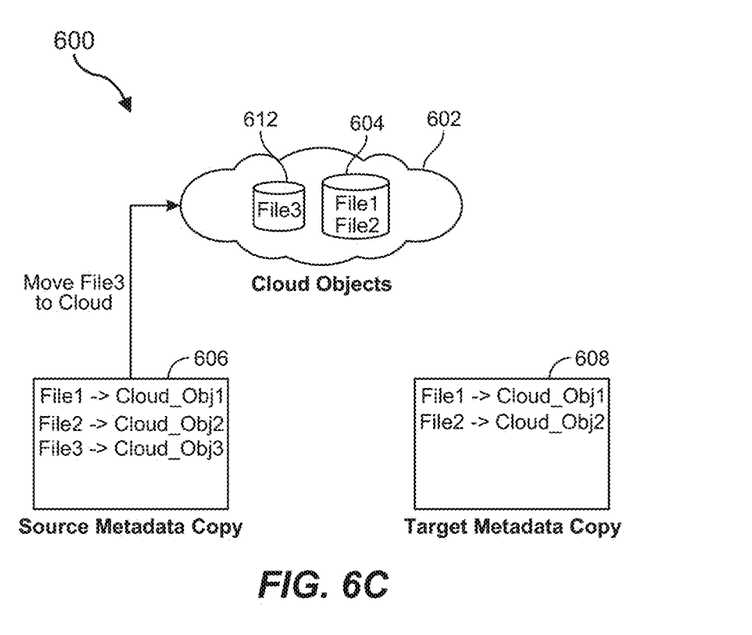
Figure 6D:
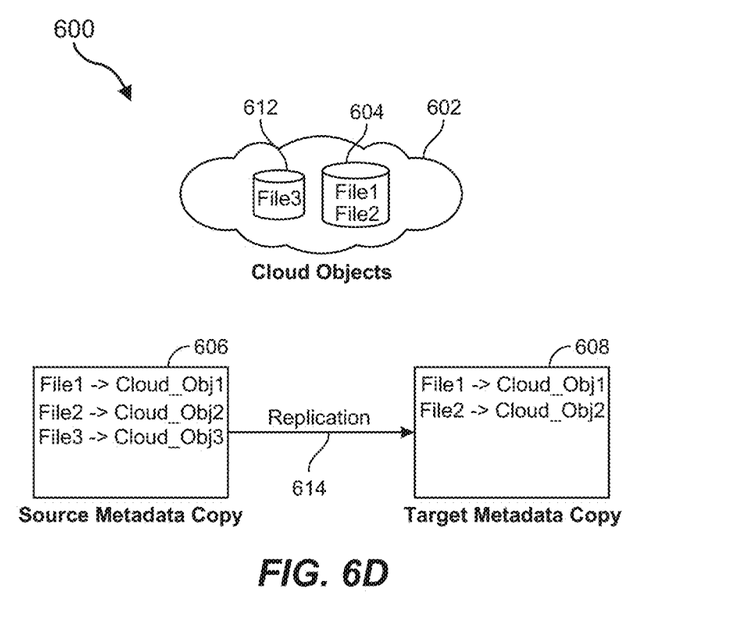
Figure 6E:
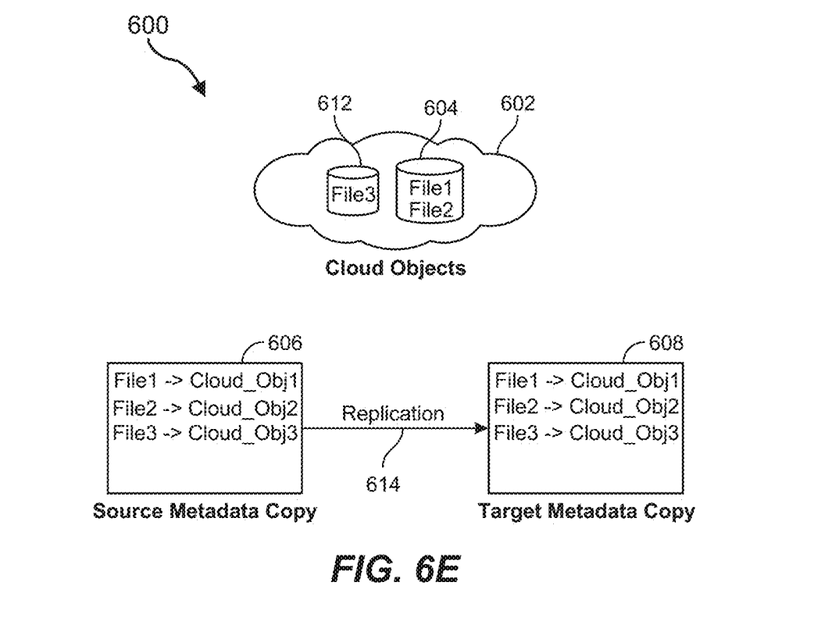

In FIG. 6C, volume manager module 104 may create a new cloud object 612 and update the source data 606 data to reference the new cloud object 612. At this point, the target data 608 may still be out of sync with source data 606. In FIG. 6D, replication system 600 may perform a replication process 614 to replicate the source data 606 to the target data 608. In some examples, replication process 614 may be implemented by replication module 106 as part of computing device 202. In FIG. 6E, the replication process 614 has completed and the target data 608 is in sync with the source data 606.

Figure 6F:
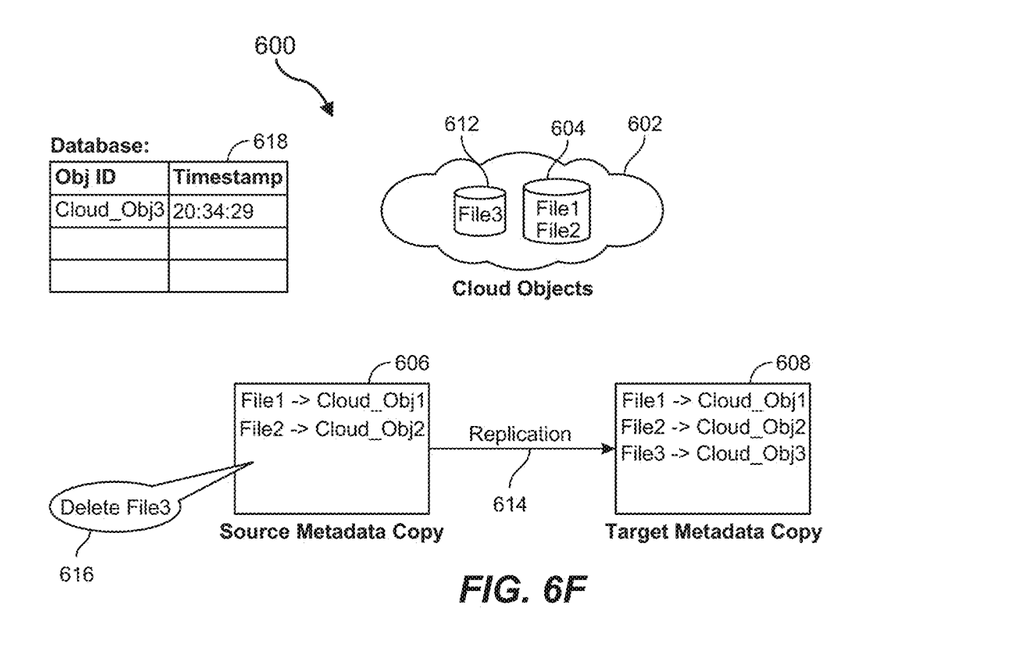
Figure 6G:
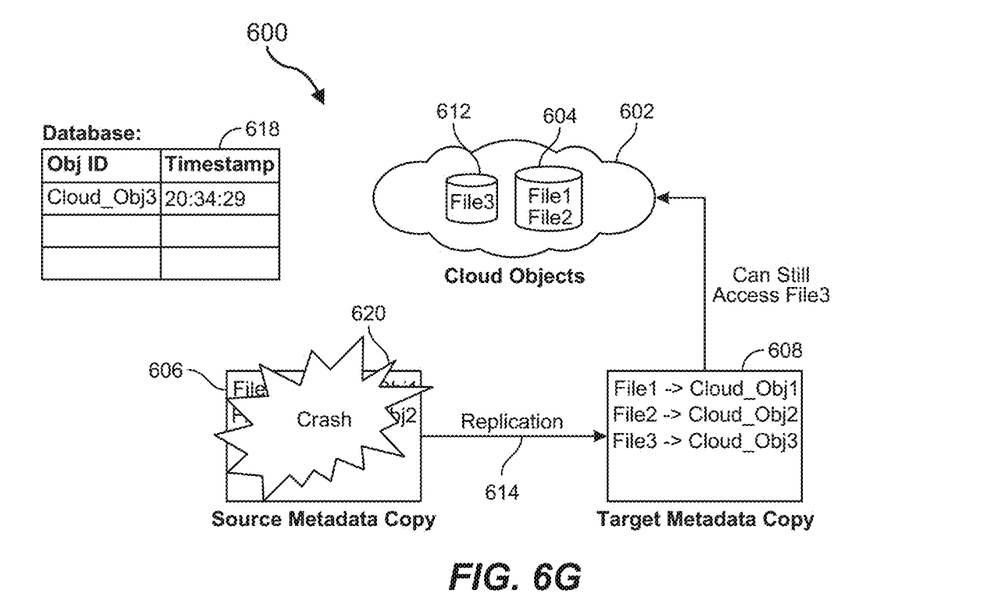

In FIG. 6F, volume manager module 104 may receive a request 616 to modify a file. For example, volume manager module 104 may receive request 616 to delete a file. Volume manager module 104 does not immediately delete the corresponding cloud object 612, but instead stores an instruction for deleting the object 612 in cloud modification database 618 along with a timestamp. At this point the source data 606 and the target data 608 are once again out of sync until replication system 600 implements the next replication process.

Figure 6H:
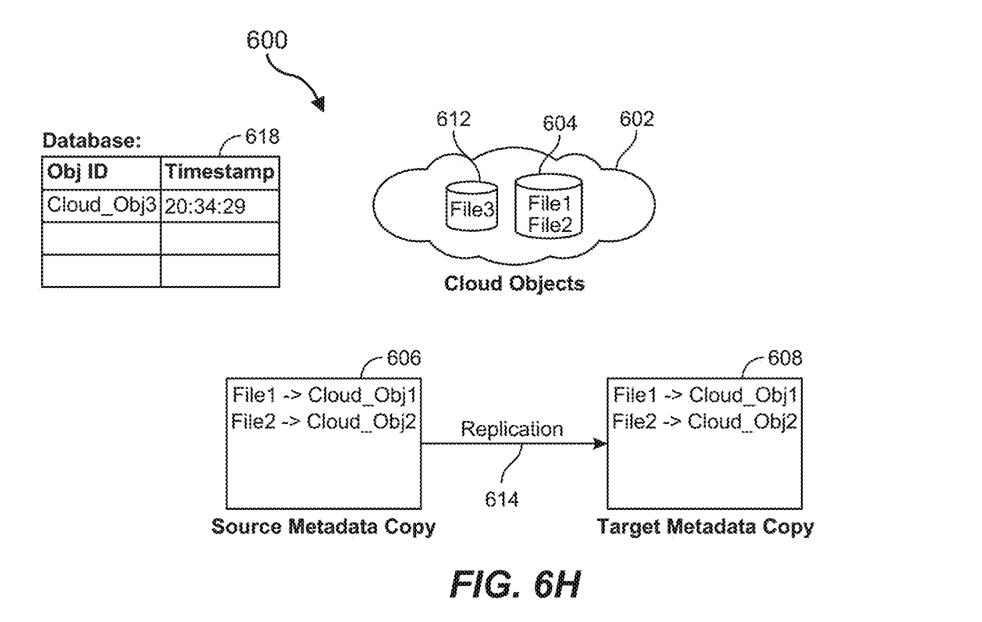
Figure 6I:
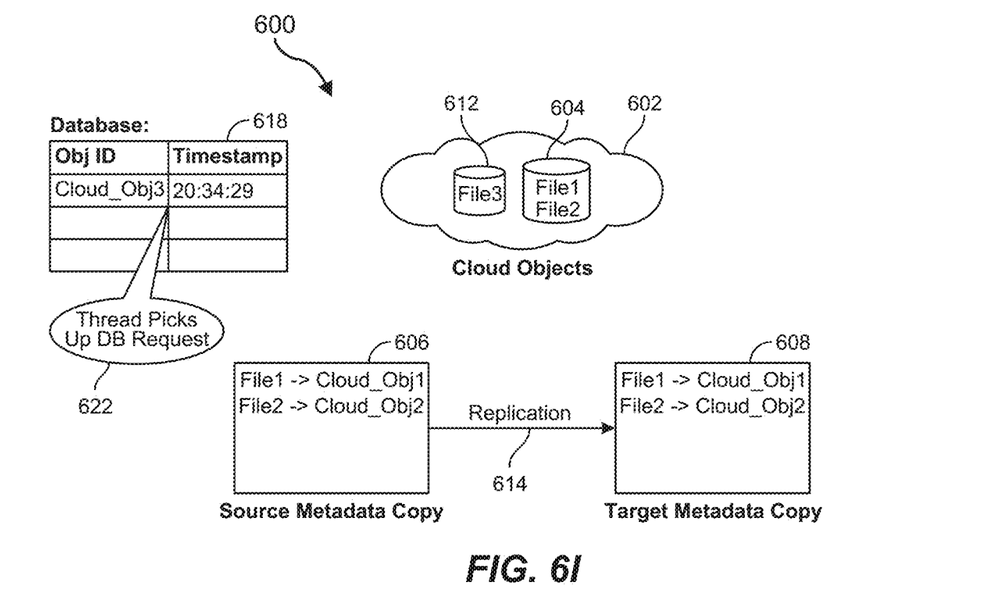

FIG. 6I illustrates the effects of a crash or other disaster happening at a system associated with the source data 606. Since the replication system 600 has not yet replicated the source data 606 to target data 608, a computing system associated with the target data is unaware that the system associated with the source data 606 has deleted the file. The file remains accessible by the computing system associated with the target data 608, since the referenced cloud object 612 has not yet been deleted by the volume manager module 104. If the volume manager module had deleted the cloud object 612 immediately, then any attempt to access the file would result in an error since the corresponding cloud object 612 would not match the reference in the target data 608.

Figure 6J:
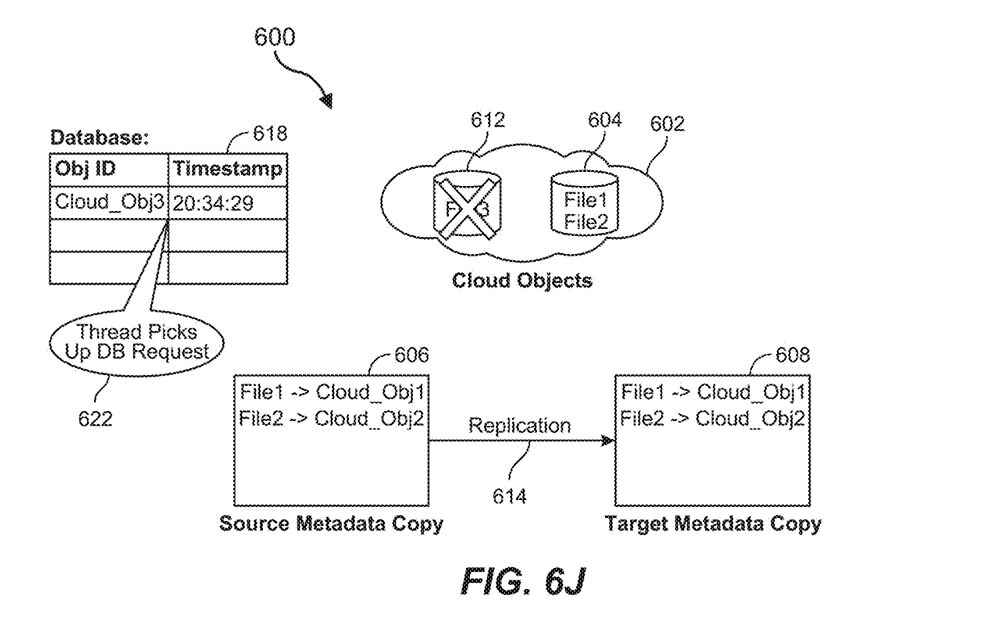
Figure 6K:
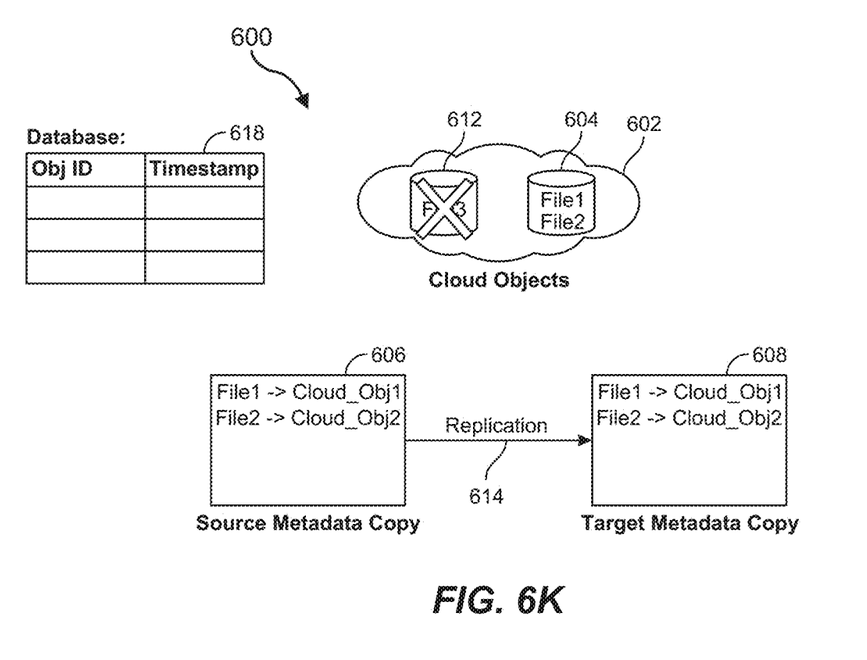

If no crash were to occur, as shown in FIG. 6H, then the replication process 614 may replicate the deletion of the file in the source data 606 to the target data 608. In FIG. 6I, a cloud modification process 622 may access cloud modification database 618 to implement any changes to the cloud objects 604, 612. For example, volume manager module 104 may have a process 622 that wakes periodically to analyze cloud medication database 618. The target data 608 and source data 606 are now in sync and the cloud modification database 618 may indicate that the replication of the instruction in complete. As shown in FIG. 6J, the instruction to delete the cloud object 612 may be executed and the cloud object 612 may be deleted. For example, volume manager module 104 may delete cloud object 612. FIG. 6K illustrates the instruction being deleted from the cloud modification database 120. For example, volume manager module 104 may delete the instruction from the cloud medication database 618. At this state, the source data 606 and the target data 608 are once again in sync.

As explained above in connection with FIGS. 1-6, a system for storage block replication in a hybrid storage environment may replicate a hybrid storage without the risk of cloud objects being inconsistent with replicated data. In instances of asynchronous replication, the system delays modifications to cloud objects until the local data referencing those objects has been successfully replicated. This allows for more efficient storage since only the local data needs to be replicated instead of both the local data and the cloud data.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all, or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for storage block replication in a hybrid storage environment, at least a portion of the method being performed by a computing device comprising at least one processor, the method comprising:
    receiving a request to modify a cloud object, wherein the request is associated with a data source being replicated;
    storing an instruction associated with the request to modify the cloud object;
    determining a replication lag time;
    calculating a marker time based on a current time and the replication lag time;
    determining, at least in part by comparing the marker time to a timestamp, that a replication operation associated with the request to modify the cloud object has completed; and
    in response to determining that the replication operation has completed, modifying the cloud object and deleting the instruction for modifying the cloud object.

2. The computer implemented method of claim 1, wherein modifying the cloud object comprises deleting the cloud object.

3. The computer implemented method of claim 1, further comprising:
    receiving another request to modify another cloud object, wherein the request is associated with the data source being replicated;

determining that the source being replicated is being replicated synchronously; and in response to determining that the source is being replicated synchronously, immediately modifying the other cloud object.

4. The computer implemented method of claim 1, further comprising:

storing the timestamp for the request to modify a cloud object.

5. The method of claim 4, further comprising storing the request to modify the cloud object and the timestamp in a cloud modification database.

6. The method of claim 5, further comprising sorting entries in the cloud modification database according to the timestamp.

7. The method of claim 1, further comprising:

modifying a data source comprising metadata referencing locations of a plurality of cloud objects in a cloud storage; and replicating the modified data source.

8. A system for storage block replication in a hybrid storage environment, the system comprising:

a volume manager module, stored in memory, the volume manager module operable to:

receive a request to modify a cloud object, wherein the request is associated with a source volume being replicated;

store an instruction for modifying the cloud object;

determine a replication lag time;

calculate a marker time based on a current time and the replication lag time;

determine, at least in part by comparing the marker time to a timestamp, that a replication operation for the source volume has completed; and in response to a determination that the replication operation has completed, modify the cloud object and delete the instruction for modifying the cloud object; and at least one physical processor that implement the volume manager module.

9. The system of claim 8, further comprising:

a volume replicator module, stored in memory, the volume replicator module operable to replicate the source volume to a target volume, wherein the source volume comprises data mapping a cloud volume; and wherein the at least one physical processor further implements the volume replicator module.

10. The system of claim 8, wherein modifying the cloud object comprises deleting the cloud object.

11. The system of claim 8, wherein the volume manager module is further operable to:

receive another request to modify another cloud object, wherein the request is associated with the source volume being replicated;

determine that the source being replicated is being replicated synchronously; and in response to determining that the source is being replicated synchronously, immediately modifying the other cloud object.

12. The system of claim 8, wherein the volume manager module is further operable to:

store the timestamp for the request to modify a cloud object.

13. The system of claim 12, wherein the volume manager is further operable to store the request to modify the cloud object and the timestamp in a cloud modification database.

14. The system of claim 13, wherein the volume manager is further operable to sort entries in the cloud modification database according to the timestamp.

15. The system of claim 9, wherein the volume replicator module is further operable to:

store a data source comprising metadata referencing locations of a plurality of cloud objects in a cloud storage;

modify the data source; and replicate the modified data source.

16. A non-transitory computer-readable medium comprising one or more computer-executable instructions that, when executed by at least one processor of a computing device, cause the computing device to:

receive a request to modify a cloud object, wherein the request is associated with a data source being replicated;

store an instruction for modifying the cloud object;

determine a replication lag time;

calculate a marker time based on a current time and the replication lag time;

determine, at least in part by comparing the marker time to a timestamp, that a replication operation for the source has completed; and in response to a determination that the replication operation has completed, modify the cloud object and delete the instruction for modifying the cloud object.

17. The non-transitory computer-readable medium of claim 16, wherein modifying the cloud object comprises deleting the cloud object.

18. The non-transitory computer-readable medium of claim 16, wherein the computer executable instructions further cause the computing device to:

store the timestamp for the request to modify a cloud object.

19. The non-transitory computer-readable medium of claim 18, wherein the computer executable instructions further cause the computing device to store the request to modify the cloud object and the timestamp in a cloud modification database.

20. The non-transitory computer-readable medium of claim 16, wherein the computer executable instructions further cause the computing device to:

modify a data source comprising metadata referencing locations of a plurality of cloud objects in a cloud storage and replicate the modified data source.

* * * * *